A. COUSOT.
TOOL AND TOOL HOLDER FOR METAL WORKING.
APPLICATION FILED JAN. 16, 1912.
1,085,079.
Patented Jan. 20, 1914.
2 SHEETS—SHEET 1.
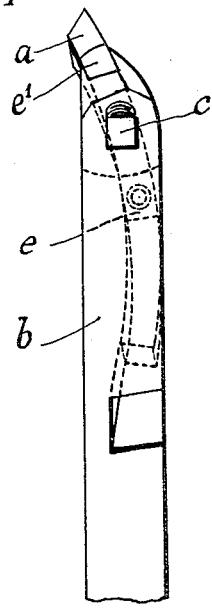
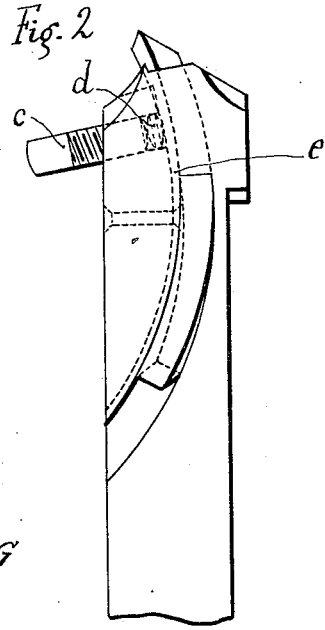
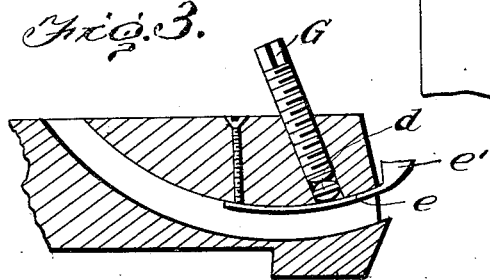
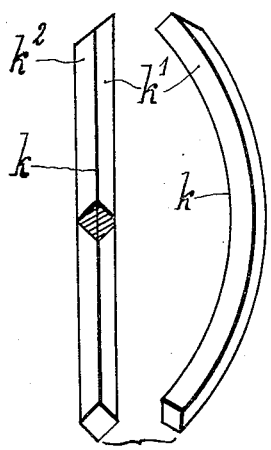
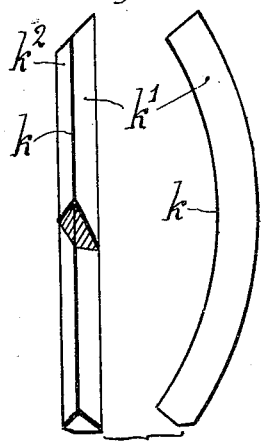
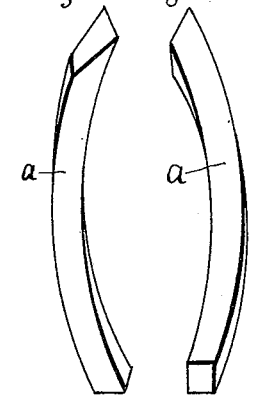
Witnesses:
Inventor.
Achille Cousot A. COUSOT.
TOOL AND TOOL HOLDER FOR METAL WORKING.
APPLICATION FILED JAN. 16. 1912.
1,085,079.
Patented Jan. 20, 1914.
2 SHEETS—SHEET 2.
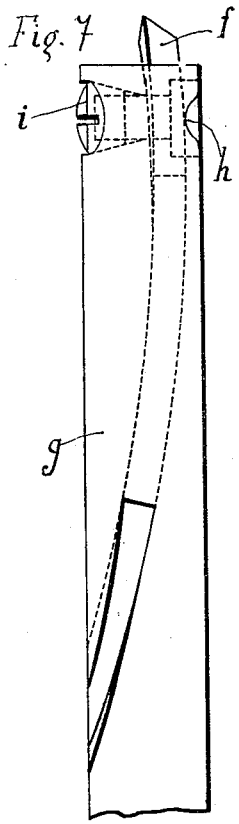
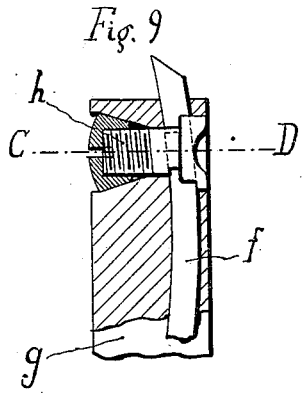
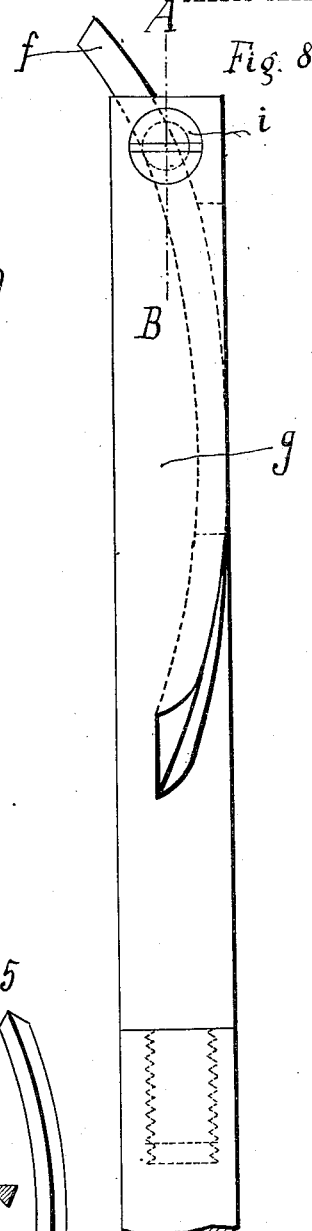
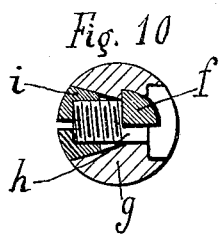
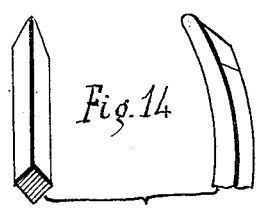
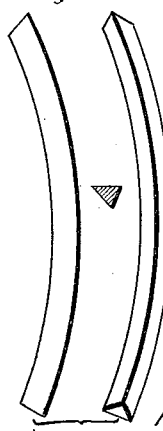
Witnesses:
Inventor
Achille Cousot
Attorney

UNITED STATES PATENT OFFICE.

ACHILLE COUSOT, OF GENEVA, SWITZERLAND.

TOOL AND TOOL-HOLDER FOR METAL-WORKING.

1,085,079.  Specification of Letters Patent.  Patented Jan. 20, 1914.

Application filed January 16, 1912. Serial No. 671,436.

*To all whom it may concern:*

Be it known that I, ACHILLE COUSOT, a citizen of the Swiss Republic, and resident of Geneva, Switzerland, have invented certain new and useful Improvements in Tools and Tool-Holders for Metal-Working, of which the following is a specification.

This invention relates to metal working tools with a tool holder allowing of getting the cut of the usual turning tools taken in the solid bar and to keep up this cut when sharpening the tool.

With this object in view the tool is provided with two arc shaped portions in two different planes and is located and maintained in a hollow of the tool holder, which is shaped in such a manner that the working end of the tool, which extends beyond the head of the tool holder, is turned upward and projects at the same time beyond one of the sides of said tool holder. The working end of the tool is consequently provided with the cut of the usual turning tools taken in the bar, and, owing to the double curved tool, this arrangement of the working end of the tool is secured without increasing the obstruction overall dimension as compared with the tool holders holding usual tools. The tool's cut is kept the same during the whole working period of the tool by simply feeding the tool according to its length becoming less owing to the wear and tear.

The invention is shown in the accompanying drawings, in which:

Figure 1 is a top view of said tool secured in its holder. Fig. 2 is a side view corresponding to Fig. 1. Fig. 3 is a front or head view of the same. Figs. 4 to 6 are views of the same tool separated from its holder. Fig. 7 is a lateral view of a somewhat modified form of tool in its holder which is of cylindrical shape. Fig. 8 is a top view corresponding to Fig. 7. Fig. 9 is a section on line A—B of Fig. 8. Fig. 10 is a cross section on line C—D of Fig. 9. Figs. 11–15 are various constructive forms of the tool.

In the constructive form shown in Figs. 1–6, $a$ is a tool introduced in a hollow provided at the head part of the tool holder $b$ and secured in position by means of a screw $c$ acting upon a biconvex disk $d$ which bears against a spring $e$ located within the hollow of the tool holder $b$.

Figs. 4 to 6 show the tool separated from the holder and serve to show the three curves of the tool. As the tool is inserted in the holder, as shown in Fig. 2, the cutting edge is directed slightly upwardly with regard to the face of the work, thus giving the tool a forward and upward movement which will occupy a smaller space than if the tool were straight. This is accomplished by means of the downward curve $k$ of the tool.

The tool is also curved longitudinally or from the right to the left as shown at $k^2$, in Fig. 1. This curve allows of the working end of the tool projecting beyond the plane of the side of the tool holder.

As shown in Figs. 1 and 2, the slot or recess in the holder within which the tool is secured is larger at its back side than the tool itself, so that the front part of the tool, under the action of the screw $c$, is brought exactly in the desired position which is determined by the front opening of said slot notwithstanding slight differences of shape which may exist between the tool and the slot of the holder accommodating the latter.

At its front end the spring $e$ is provided with an outer facet $e'$ which is inclined with respect to the upper face of the tool, so as to reject upward the chip which has been removed by the tool and to prevent said chip from penetrating between the spring and the tool.

Figs. 7 to 10 show a tool $f$ of helical shape like that of the foregoing figures, but of triangular section, with an arc shaped face and mounted on a boring tool holder $g$ of circular section. The tool $f$ is secured to the tool holder $g$ by means of a clamping screw $h$ having its head sunk into the end of the tool holder, and provided with a clamping nut $i$ which is also sunk in a corresponding hollow of the tool holder's end.

Instead of helical form as above described, the shape of the tool may be such as results from rolling around a cylinder, and in a plane perpendicular to the axis of said cylinder, a bar of a polygonal cross section diagonally placed with respect to the cylinder, that is to say in contact with the cylinder only by one of its edges. In these conditions the various faces of the bar are curved according to different planes which allow of obtaining the forward cut and the lateral projection of the tool's working end with respect to the tool holder as above stated.

The tools shown in Figs. 11 and 12 are made as stated before, that is to say they are produced by winding around a cylinder, and according to a plane which is perpendicular to the axis of said cylinder, a bar of polygonal cross section diagonally placed with respect to said cylinder, that is to say that only one edge $k$ of the bar contacts with the cylinder. Due to this position, the bar is curved in different directions, namely, a downward or arc curve $k$, and a longitudinal curve or twist $k^2$, the functions of which have been explained.

Another shape of the tool may result from the winding of a bar upon a cylinder according to a plane which is inclined to the axis of said cylinder, the faces of the tool thus becoming helical as above stated. The double arched tool could also be obtained by circularly winding the bar, from which the tool is made, (without giving it a diagonal position with respect to the winding plane) and by twisting the arc shaped bar thus produced. There may be, of course, made use of any other process for providing a tool having the above stated shape.

As shown in Figs. 13–15, the front end of the tool may be sharpened by any usual means according to the work to be performed by the tool.

Having now fully described my said invention, what I claim and desire to secure by Letters Patent, is:

In a lathe tool the combination with a shank or holding bar, having an arc-shaped recess therein, said recess curving downwardly, laterally and upwardly, a similarly arc-shaped tool in said recess, an upwardly inclined facet adjacent the outer upper end of said recess, a spring member in said recess adapted to bear upon the upper face of said tool, means for holding the spring in position, and means for forcing said spring against the tool face, whereby to hold the tool in operative position.

In testimony whereof I have hereunto set my hand in presence of two witnesses.

ACHILLE COUSOT.

Witnesses:
 PIERRE PICTROS,
 THOMAS W. JAMES.